US008766196B2

(12) United States Patent
Jagannathan et al.

(10) Patent No.: US 8,766,196 B2
(45) Date of Patent: *Jul. 1, 2014

(54) RADIATION SENSING THERMOPLASTIC COMPOSITE PANELS

(75) Inventors: Seshadri Jagannathan, Rochester, NY (US); Chang-Ying Joseph Yang, Webster, NY (US); Kevin L. Bishop, Rochester, NY (US); Mark S. Purdum, Ontario, NY (US)

(73) Assignee: Carestream Health, Inc., Rochester, NY (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/170,622

(22) Filed: Jun. 28, 2011

(65) Prior Publication Data

US 2013/0001423 A1 Jan. 3, 2013

(51) Int. Cl.
*G01T 1/20* (2006.01)

(52) U.S. Cl.
USPC ........................................................ 250/361 R

(58) Field of Classification Search
USPC ........................................... 250/361 R, 484.4
See application file for complete search history.

(56) References Cited

U.S. PATENT DOCUMENTS

| | | | | |
|---|---|---|---|---|
| 3,418,470 | A * | 12/1968 | Birkeland | 250/474.1 |
| 4,637,898 | A | 1/1987 | DeBoer et al. | |
| 5,686,674 | A * | 11/1997 | Lowry et al. | 73/865.8 |
| 6,624,436 | B1 * | 9/2003 | Kohda | 250/581 |
| 2001/0001696 | A1 * | 5/2001 | Tai et al. | 430/26 |
| 2002/0158216 | A1 * | 10/2002 | Neriishi et al. | 250/584 |
| 2003/0003312 | A1 * | 1/2003 | Aylward et al. | 428/480 |
| 2007/0267576 | A1 * | 11/2007 | Loureiro et al. | 250/362 |
| 2009/0283685 | A1 * | 11/2009 | Takeda et al. | 250/370.11 |
| 2013/0026392 | A1 * | 1/2013 | Jagannathan et al. | 250/483.1 |

FOREIGN PATENT DOCUMENTS

| | | | |
|---|---|---|---|
| EP | 0 124 683 | A | 11/1984 |
| GB | 2 096 160 | A | 10/1982 |

OTHER PUBLICATIONS

International Search Report mailed Nov. 27, 2012 for International Application No. PCT/US2012/043062, 2 pages.
Ehsan Samei et al., "A method for measuring the presampled MTF of digital radiographic systems using an edge test device", Med. Phys. vol. 25 (1), Jan. 1998, 1998 Am. Assoc. Phys. Med., pp. 102-113.
Ehsan Samei et al., "Intercomparison of methods for image quality characterization" I. Modulation transfer function, Med. Phys. vol. 33 (5), May 2006, 1998 Am. Assoc. Phys. Med., pp. 1454-1465.

(Continued)

*Primary Examiner* — David Porta
*Assistant Examiner* — Jeremy S Valentiner

(57) ABSTRACT

A transparent scintillator panel including an extruded scintillation layer comprising a thermoplastic polyolefin and a scintillator material, wherein the transparent scintillator panel has an intrinsic MTF at least 5% greater than the iH50 of a solvent-coated DRZ+ screen. Also disclosed is a scintillation detection system including a transparent scintillator panel comprising an extruded scintillation layer comprising a thermoplastic olefin and a scintillator material; and at least one photodetector coupled to the transparent scintillator panel, wherein at least one photodetector is configured to detect photons generated from the transparent scintillator panel. Further disclosed is a method of making a transparent scintillator panel including providing thermoplastic particles comprising at least one thermoplastic polyolefin and a scintillator material; and melt extruding the thermoplastic particles to form an extruded scintillation layer.

16 Claims, 3 Drawing Sheets

(56) References Cited

OTHER PUBLICATIONS

Ehsan Samei et al., "Comparison of edge analysis techniques for the determination of the MTF of digital radiographic systems", Phys. Med. Biol. vol. 50, 2005, pp. 3613-3625, Physics in Medicine and Biology.

Hiroshi Fujita et al., "A simple method for determining in modulation transfer function in digital Radiography", IEEE Transactions on Medical Imaging, vol. 11, No. 1, Mar. 1992.

I. A. Cunningham et al., "A method for modulation transfer function determination from edge profiles with correction for finite-element differentiation", Med. Phys. vol. 14, (4), Jul./Aug. 1987, 1987 Am. Assoc. Phys. Med, pp. 533-537.

* cited by examiner

RADIATION SENSING THERMOPLASTIC COMPOSITE PANELS

FIELD OF THE INVENTION

The invention relates generally to the field of scintillation materials, and in particular to extruded scintillation materials including thermoplastic polyolefins and scintillator materials. More specifically, the invention relates to a transparent scintillator panel including an extruded scintillation layer comprising thermoplastic polyolefins and scintillator materials, and method for making the same.

BACKGROUND OF THE INVENTION

Scintillators are materials that convert high-energy radiation, such as X-rays and gamma rays, into visible light. Scintillators are widely used in detection and non-invasive imaging technologies, such as imaging systems for medical and screening applications. In such systems, high-energy photons (e.g., X-rays from a radiation source) typically pass through the person or object undergoing imaging and, on the other side of the imaging volume, impact a scintillator associated with a light detection apparatus. The scintillator typically generates optical photons in response to high-energy photon collisions. The optical photons may then be measured and quantified by light detection apparatuses, thereby providing a surrogate measure of the amount and location of high-energy radiation incident on the light detector (usually a photodetector).

For example, a scintillator panel is typically used in computed tomography (CT) imaging systems. In CT systems, an X-ray source emits a fan-shaped beam towards a subject or object capable of being imaged, such as a patient or a piece of luggage. The high-energy photons from X-rays, after being attenuated by the subject or object, collide with a scintillator panel. The scintillator panel converts the X-rays to light energy ("optical photons") and the scintillator panel illuminates, discharging optical photons that are captured by a photodetector (usually a photodiode) which generates a corresponding electrical signal in response to the discharged optical photons. The photodiode outputs are then transmitted to a data processing system for image reconstruction. The images reconstructed based upon the photodiode output signals provide a projection of the subject or object similar to those available through conventional photographic film techniques.

Resolution is a critical criterion for any imaging system or device, especially in CT systems and the like. In the case of CT and other like imaging systems, a number of factors can determine resolution; however, this application focuses on the scintillation panel and its effects on resolution. When a continuous, homogeneous scintillation layer is used, lateral propagation of scintillation light is known to reduce image resolution. For example, when optical photons are generated in response to X-ray exposure, these optical photons can spread out or be scattered in the scintillation panel, due to optical properties of the panel, and can be detected by more than one photodetector coupled to the scintillation panel. Detection by more than one photodetector usually results in reduced image resolution. Several approaches have been developed to help offset optical photon diffusion, including reducing the thickness of the scintillation layer. This reduces the distance the optical photons may travel in the scintillation layer. However, the thinner the scintillation layer, the lower the conversion efficiency since there is less scintillating material for a source radiation photon to stimulate. Thus, the optimum scintillation layer thickness for a given application is a reflection of the balance between imaging speed and desired image sharpness.

Another approach known in the art is to employ thallium doped cesium iodide (CsI:Tl) scintillation layers. Thallium doped cesium iodide scintillation panels have the potential to provide excellent spatial resolution for radiographic applications since CsI-based panels are able to display high X-ray absorptivity and high conversion efficiency. However, this potential is difficult to realize in practical applications due to the mechanical and environmental fragility of CsI-based materials. For example, CsI is highly water soluble and hygroscopic. Any scintillation panels made with CsI:Tl must be maintained in a sealed, low humidity environment to avoid attracting water that can negatively affect luminescence. CsI:Tl structures are also mechanically fragile, requiring special handling procedures during and after manufacture such as complete enclosure in shock resistant containers. As a result, production (and end product) costs are quite high in applications that have successfully realized the image quality benefit of thallium doped cesium iodide scintillation panels.

An alternative approach to using thallium doped cesium iodide is to increase the transparency of the scintillation layer in the scintillator panel. It is generally understood that a perfectly transparent scintillator panel would provide the highest spatial resolution. However, while the most transparent scintillator would be a single crystal, single crystal scintillator panels have not yet been constructed with practically useful dimensions and sufficient X-ray absorptivity for radiographic applications. Another option for increasing transparency is to disperse particulate scintillators in a polymeric matrix having a refractive index identical or closely similar to that of the scintillator; however, this approach requires a high loading of scintillator particles in the polymeric matrix, which to date has not yet been successfully achieved with practically useful dimensions and sufficiently high scintillator particulate loads.

While prior techniques may have achieved certain degrees of success in their particular applications, there is a need to provide, in a cost-friendly manner, transparent scintillator panels having not only image quality approaching that of CsI-based scintillator panels but also excellent mechanical and environmental robustness.

SUMMARY OF THE INVENTION

In an aspect, there is provided a transparent scintillator panel including an extruded scintillation layer comprising a thermoplastic polyolefin and a scintillator material, wherein the transparent scintillator panel has an intrinsic MTF at least 5% greater than the iH50 of a solvent-coated DRZ+ screen.

In another aspect, there is also disclosed a scintillation detection system including a transparent scintillator panel comprising an extruded scintillation layer comprising a thermoplastic olefin and a scintillator material; and at least one photodetector coupled to the transparent scintillator panel, wherein at least one photodetector is configured to detect photons generated from the transparent scintillator panel.

In a further aspect, there is disclosed a method of making a transparent scintillator panel including providing thermoplastic particles comprising at least one thermoplastic polyolefin and a scintillator material; and melt extruding the thermoplastic particles to form an extruded scintillation layer.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figures 1, 1A, 1B, 1C:
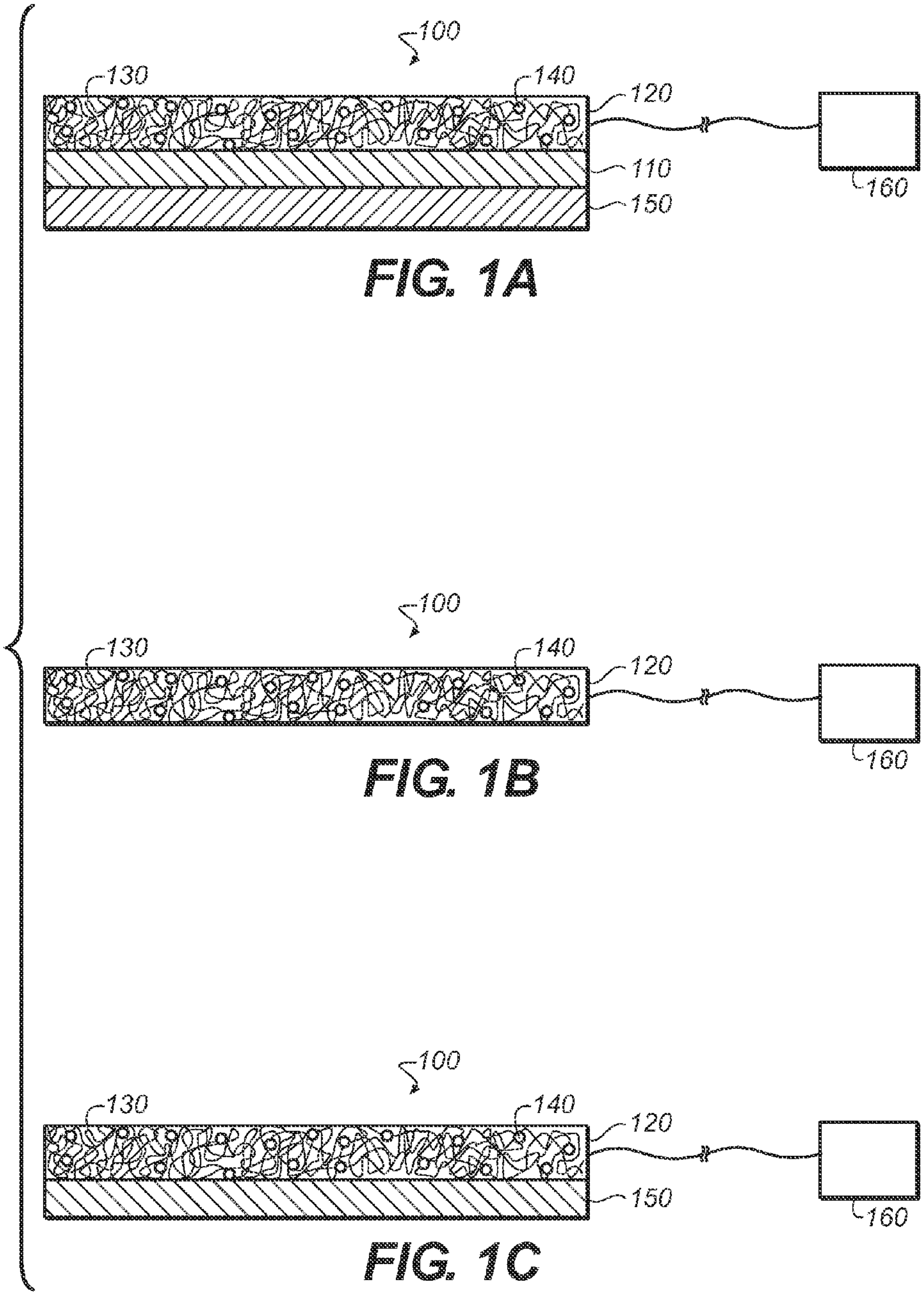
FIGS. 1A-1C depict exemplary portions of scintillator panels in accordance with various embodiments of the present disclosure.

The following is a detailed description of the preferred embodiments of the invention, reference being made to the drawings in which the same reference numerals identify the same elements of structure in each of the several figures.

Exemplary embodiments herein provide transparent scintillator panels including an extruded scintillation layer with a thermoplastic polyolefin and a scintillator material, and methods of preparing thereof. In embodiments, the transparent scintillator panel has an intrinsic MTF at least 5% greater than the iH50 of a solvent-coated DRZ+ screen.

FIGS. 1A-1C depict a portion of an exemplary transparent scintillator panel 100 in accordance with various embodiments of the present disclosure. As used herein, “scintillator panel” is understood to have its ordinary meaning in the art unless otherwise specified, and refers to panels or screens that can generate visible light immediately upon exposure to X-radiation (also known as “prompt emission panels” or “intensifying screens”). As such, “panels” and “screens” are used interchangeably herein. It should be readily apparent to one of ordinary skill in the art that the scintillator panel 100 depicted in FIGS. 1A-1C represent a generalized schematic illustration and that other components can be added or existing components can be removed or modified.

Scintillator panels disclosed herein can take any convenient form provided they meet all of the usual requirements for use in computed or digital radiography. As shown in FIG. 1A, the scintillator panel 100 may include a support 110 and an extruded scintillation layer 120 disposed over the support 110. Any flexible or rigid material suitable for use in scintillator panels can be used as the support 110, such as glass, plastic films, ceramics, polymeric materials, carbon substrates, and the like. In certain embodiments, the support 110 can be made of ceramic, (e.g., $Al_2O_3$,) or metallic (e.g., Al) or polymeric (e.g., PET) materials. Also as shown in FIG. 1A, in an aspect, the support 110 can be coextruded with the scintillation layer 120. Alternatively, if desired, a support can be omitted in the scintillator panel. As shown in FIGS. 1B and 1C, the scintillator panel can include a scintillation layer 120 and/or an opaque layer 150 without a support.

In an aspect, an opaque layer 150 can be extruded, for example melt extruded, on the support 110 to eliminate ambient light from reaching the scintillation layer. For example, in an embodiment, the opaque layer 150 can comprise black dyes or carbon black and a suitable binder, such as polyethyelene (e.g., LDPE). As shown in FIG. 1A, the opaque layer 150 can be extruded on the backside of the support 110 (e.g., on the opposite side of the support 110 having the scintillation layer 120), or on the same side as the scintillation layer (e.g., sandwiched in between the support 110 and the scintillation layer 120). Alternatively, if the support 110 comprises a carbon support having a black surface (e.g., graphite) an opaque layer may not be needed. In yet another aspect, the opaque layer 150 can be co-extruded with the scintillation layer, without or without a support, as seen in FIG. 1C.

In an aspect, an anticurl layer may be coextruded on either side of the support, if a support is used, or on side of the scintillator screen, to manage the dimensional stability of the scintillator screen.

The thickness of the support 110 can vary depending on the materials used so long as it is capable of supporting itself and layers disposed thereupon. Generally, the support can have a thickness ranging from about 50 μm to about 1,000 μm, for example from about 80 μm to about 1000 μm, such as from about 80 μm to about 500 μm. The support 110 can have a smooth or rough surface, depending on the desired application. In an embodiment, the scintillator panel does not comprise a support.

The scintillation layer 120 can be disposed over the support 110, if a support is included. Alternatively, the scintillation layer 120 can be extruded alone or co-extruded with an opaque layer, and anticurl layer, and combinations thereof, as shown in FIGS. 1B and 1C.

The scintillation layer 120 can include a thermoplastic polyolefin 130 and a scintillator material 140. The thermoplastic polyolefin 130 may be polyethylene, a polypropylene, and combinations thereof. In an aspect, the polyethylene can be high density poly low density polyethylene (LDPE), medium density polyethylene (MDPE), linear low density polyethylene (LLDPE), very low density polyethylene (VLDPE), and the like. In a preferred embodiment, the thermoplastic polyolefin 130 is low density polyethylene (LDPE). The thermoplastic polyolefin 130 can be present in the scintillation layer 120 in an amount ranging from about 1% to about 50% by volume, for example from about 10% to about 30% by volume, relative to the total volume of the scintillation layer 120.

The scintillation layer 120 can include a scintillator material 140. As used herein, “scintillator material” and “scintillation material” are used interchangeably and are understood to have the ordinary meaning as understood by those skilled in the art unless otherwise specified. “Scintillator material” refers to inorganic materials capable of immediately emitting low-energy photons (e.g., optical photons) upon stimulation with and absorption of high-energy photons (e.g., X-rays). Materials that can be used in embodiments of the present disclosure include metal oxides, metal oxyhalides, metal oxysulfides, metal halides, and the like, and combinations thereof. In embodiments, the scintillator material 140 can be a metal oxide, for example, $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $RE_3Al5O_{12}$:Ce, and combinations thereof, wherein RE is at least one rare earth metal. In another embodiment, the scintillator material 140 can include one or more metal oxysulfides in addition to, or in place of, the metal oxides, such as $Gd_2O_2S$, $Gd_2O_2S$:Tb, $Gd_2O_2S$:Pr, and the like, and combinations thereof. In other embodiments, the scintillator material 140 can include a metal oxyhalide, such as LaOX:Tb, wherein X is Cl, Br, or I. In further embodiments, the scintillator material 140 can be a metal halide having a general formula of $M(X)_n$: Y, wherein M is at least one of La, Na, K, Rb, Cs; each X is independently F, CI, Br, or I; Y is at least one of Tl, Tb, Na, Ce, Pr, and Eu; and n is an integer between 1 and 4, inclusive. Such metal halides can include, for example, $LaCl_3$:Ce and $LaBr_3$:Ce, among others. Other metal halide species that can be used in embodiments of the present disclosure include $RbGd_2F_7$:Ce, $CeF_3$, $BaF_2$, CsI(Na), $CaF_2$:Eu, LiI: Eu, CsI, CsF, CsI:Tl, NaI:Tl, and combinations thereof. Halide-like species, such as CdS:In, and ZnS can also be used in embodiments of the present disclosure. Preferably, the scintillator material 140 is a metal oxysulfide, such as $Gd_2O_2S$.

In embodiments, the scintillator material 140 can be present in the extruded scintillator layer 120 in an amount ranging from about 50% by volume to about 99% by volume, for example from about 70% by volume to about 90% by volume, relative to the volume of the extruded scintillator layer 120.

The thermoplastic polyolefin 130 and the scintillator material 140 are melt compounded to form composite thermoplastic particles which are then extruded to form the scintillation layer 120. For example, the composite thermoplastic particles can be prepared by melt compounding the thermoplastic polyolefin 130 with the scintillator material 140 using a twin screw compounder. The ratio of thermoplastic polyolefin 130 to scintillator material 140 (polyolefin:scintillator) can range from about 1:100 to about 1:0.01, by weight or volume, preferably from about 1:1 to about 1:0.1, by weight or volume. During melt compounding, the thermoplastic olefin 130 and the scintillator material 140 can be compounded and heated through ten heating zones. For example, the first heating zone can have a temperature ranging from about 175° C. to about 180° C.; the second heating zone can have a temperature ranging from about 185° C. to about 190° C.; the third heating zone can have a temperature ranging from about 195° C. to about 200° C.; the fourth heating zone can have a temperature ranging from about 195° C. to about 200° C.; the fifth heating zone can have a temperature ranging from about 185° C. to about 190° C.; the sixth heating zone can have a temperature ranging from about 185° C. to about 190° C.; the seventh heating zone can have a temperature ranging from about 185° C. to about 190° C.; the eighth heating zone can have a temperature ranging from about 185° C. to about 190° C.; the ninth heating zone can have a temperature ranging from about 180° C. to about 175° C.; and the tenth heating zone can have a temperature ranging from about 175° C. to about 170° C. The period of time in each zone depends on the polymer used. Generally, the polymer can be heated for a time and temperature sufficient to melt the polymer and incorporate the scintillator material without decomposing the polymer. The period of time in each zone can range from about 0.1 minutes to about 30 minutes, for example from about 1 minute to about 10 minutes. Upon exiting the melt compounder, the composite thermoplastic material can enter a water bath to cool and harden into continuous strands. The strands can be pelletized and dried at about 40° C. The screw speed and feed rates for each of the thermoplastic polyolefin 130 and the scintillator material 140 can be adjusted as desired to control the amount of each in the composite thermoplastic material.

The composite thermoplastic material can be extruded to form the scintillation layer 120 in which the scintillator material 140 is intercalated ("loaded") within the thermoplastic polyolefin 130. For example, the scintillation layer 120 can be formed by melt extruding the composite thermoplastic material. Without being limited by theory, it is believed that forming the scintillation layer 120 by extrusion increases the homogeneity of the scintillation layer, increases optical transparency, and eliminates undesirable "evaporated space" (which can contribute to decreased spatial resolution) when a solvent is evaporated in solvent-coating methods (e.g., DRZ-Plus ("DRZ+") screens, available from MCI Optonix, LLC), thereby increasing the optical transparency of the scintillation layer 120 and spatial resolution of a scintillator panel comprising the disclosed scintillation layer 120. A transparent scintillator panel 100 according to the present disclosure can thus have excellent high-energy radiation absorption ("stopping power") and high conversion efficiency, as well as mechanical and environmental robustness.

In embodiments, a transparent scintillator panel 100 having the disclosed extruded scintillation layer 120 can have an intrinsic MTF at least 5% greater than the iH50 of a solvent-coated DRZ+ screen, for example about 50% to about 95% greater than the iH50 of a solvent-coated DRZ+ screen. As used herein, intrinsic MTF (also known as "universal MTF") is understood to have its ordinary meaning in the art unless otherwise specified, and can be derived from the modulation transfer function (MTF). Intrinsic MTF (iMTF) can be derived from MTF, as shown in the following formula: iMTF ($\nu$)=MTF(f*1), where f is the spatial frequency and L is the screen thickness. ($\nu$=f*1 is therefore a dimensionless quantity.) As used herein, iH50 is the value of $\nu$ at which the iMTF=0.5. As used herein, the measure of improvement in iH50 is calculated with respect to the iH50 of a DRZ+ screen.

In computed or digital radiography, the MTF is dominantly decided by the scintillator panels used for X-ray absorption. Many well-established methods can be used for measuring MTF, all of which basically involve capturing the gray scale gradation transition in the X-ray image of an object that provides an abrupt change in X-ray signal from high to low. Exemplary methods of measuring MTF are described in A. Cunningham and A. Fenster, "A method for modulation transfer function determination from edge profiles with correction for finite element differentiation," Med. Phys. 14, 533-537 (1987); H. Fujita, D. Y. Tsai, T. Itoh, K. Doi, J. Morishita, K. Ueda, and A. Ohtsuka, "A simple method for determining the modulation transfer function in digital radiography," IEEE Trans. Med. Imaging 11, 34-39 (1992); E. Samei and M. J. Flynn, "A method for measuring the presampling MTF of digital radiographic systems using an edge test device," Med. Phys. 25, 102-113 (1998); E. Samei, E. Buhr, P Granfors, D Vandenbroucke and X Wang, "Comparison of edge analysis techniques for the determination of the MTF of digital radiographic systems," Physics in Medicine and Biology 50 (15) 3613 (2005); E Samei, N. T. Ranger, J. T. Dobbins, and Y. Chen, "Intercomparison of methods for image quality characterization. I. Modulation transfer function," Med. Phys. 33, 1454 (2006), the disclosures all of which are herein incorporated by reference in their entirety.

In a preferred embodiment, the scintillation layer 120 is co-extruded with an opaque layer 150, without a substrate. The screw speed and pump speed of the melt extruder can be adjusted to control the thickness for each of the scintillation layer 120 and the opaque layer, individually. In aspects, the extruded scintillation layer 120 does not comprise ceramic fibers.

The thickness of the scintillation layer 120 can range from about 10 μm to about 1000 μm, preferably from about 50 μm to about 750 μm, more preferably from about 100 μm to about 500 μm.

Optionally, the transparent scintillator panel 100 can include a protective overcoat disposed over the scintillation layer 120. The protective overcoat can comprise one or more polymer binders normally used for this purpose, such as cellulose ester (e.g., cellulose acetate) and other polymers that provide the desired mechanical strength and scratch and moisture resistance. However, inclusion of a protective layer on the transparent scintillator panel 100 can reduce spatial resolution.

In an embodiment, a scintillation detection system can include the disclosed transparent scintillator panel 100 coupled to at least one photodetector 160. The at least one photodetector 160 can be configured to detect photons generated from the transparent scintillator panel 100. Non-limiting examples of at least one photodetector 160 include photodiodes, photomultiplier tubes (PMT), CCD sensors (e.g., EMCCD), image intensifiers, and the like, and combinations thereof. Choice of a particular photodetector will depend, in part, on the type of scintillation panel being fabricated and the intended use of the ultimate device fabricated with the disclosed scintillation panel.

EXAMPLES

Composite Thermoplastic Particle Production

Composite thermoplastic particles according to the present disclosure were prepared comprising 80 wt. % gadolinium oxysulfide ($Gd_2O_2S$) ("GOS") and 20 wt. % low density polyethylene (LDPE 811A, available from Westlake Chemical Corp. of Houston, Tex.). The GOS powder was loaded into Feeder 2 and the LDPE was loaded into Feeder 4 of a Leistritz twin screw compounder. The die temperature was set to 200° C. and 10 heating zones within the compounder were set to the temperatures shown in Table 1 below:

TABLE 1

| | Zone | | | | | | | | | |
|---|---|---|---|---|---|---|---|---|---|---|
| | 1 | 2 | 3 | 4 | 5 | 6 | 7 | 8 | 9 | 10 |
| Temp (° C.) | 180 | 190 | 200 | 200 | 190 | 190 | 190 | 190 | 175 | 170 |

The screw speed was 300 RPM, and the GOS powder and LDPE were gravity fed into the screw compounder. After exiting the die, the composite thermoplastic particles, comprising LDPE loaded with $Gd_2O_2S$, entered a 25° C. water bath to cool and hardened into continuous strands. The strands were then pelletized in a pelletizer and dried at 40° C.

Co-Extrusion of Scintillator Layer and Opaque Layer

5% carbon black particles in LDPE were prepared by melt compounding carbon black masterbatch (Ampacet black MB-191029, available from Amapacet Corp. of Tarrytown, N.Y.) with LDPE (811A, available from Westlake Chemical Corp. of Houston, Tex.) in a Leistritz twin screw compounder under the same conditions used to produce the composite thermoplastic material. The carbon black masterbatch was loaded into Feeder 1 and the LDPE was loaded into Feeder 4 of the twin screw compounder. The screw speed was 300 RPM, and the carbon black and LDEP were gravity fed into the screw compounder. After exiting the die, the carbon black entered a 25° C. water bath to cool and hardened into continuous strands. The strands were then pelletized in a pelletizer and dried at 40° C.

For each of Inventive Examples 1 through 3, the pelletized composite thermoplastic materials were loaded into a single screw Killion extruder and the pelletized carbon black particles was loaded into a single screw Davis-Standard extruder. Within each extruder, heating zones were set to the temperatures shown in Tables 2A and 2B below:

TABLE 2A

| Davis-Standard Extruder | |
|---|---|
| Zone | Temp |
| 1 | 350° F. |
| 2 | 380° F. |
| 3 | 400° F. |
| Exit flange | 400° F. |
| Poly line 1 | 400° F. |
| Poly line 2 | 400° F. |
| Melt pump | 400° F. |

TABLE 2B

| Killion Extruder | |
|---|---|
| Zone | Temp |
| 1 | 350° F. |
| 2 | 380° F. |
| 3 | 400° F. |
| 4 | 400° F. |
| Gate | 400° F. |
| Adapter | 400° F. |
| Poly line | 400° F. |
| Melt pump | 400° F. |

Both types of pelletized materials (composite thermoplastic and carbon black) were co-extruded through a single die with the die temperature set at 400° F. form a transparent scintillator panel (Inventive Panels 1 and 2). The pelletized composite thermoplastic material formed a transparent scintillation layer, and the pelletized carbon black formed a carbon black layer Underneath the transparent scintillation layer. For each of Inventive Panels 1 and 2, the screw speed, feed rates, and layer thicknesses are described in Table 3 below. For Inventive Panel 3, the carbon black layer was not co-extruded with the composite thermoplastic materials; instead, a black film of optical density (OD) 4.5 was placed underneath the scintillation layer during radiographic measurements.

TABLE 3

| | Screw Speed (RPM) | Feed Rate | Scintillation layer thickness (micron) | Carbon Black layer thickness (micron) |
|---|---|---|---|---|
| Inventive Panel 1 | 300 | gravity | 450 | 200 |
| Inventive Panel 2 | 300 | gravity | 240 | 200 |
| Inventive Panel 3 | 300 | gravity | 256 | N/A |

The characteristics of Inventive Panels 1 through 3 described above and three types of scintillation panels known in the art are described in Table 4 below:

TABLE 4

| Panel Type | Crystal | Method | Scintillation layer thickness (microns) | X-ray Absorption | Packing Density |
|---|---|---|---|---|---|
| DRZ+ | Powder | Solvent-coated | 208 | 0.54 | 0.64 |
| MIN-R EV | Powder | Solvent-coated | 90 | 0.24 | 0.5 |
| CsI | Needle | Vapor deposition | 600 | 0.88 | 0.75 |
| Inventive Panel 1 | Powder | Extrusion | 450 | 0.57 | 0.32 |
| Inventive Panel 2 | Powder | Extrusion | 240 | 0.36 | 0.31 |
| Inventive Panel 3 | Powder | Extrusion | 256 | 0.49 | 0.44 |

Figure 2:
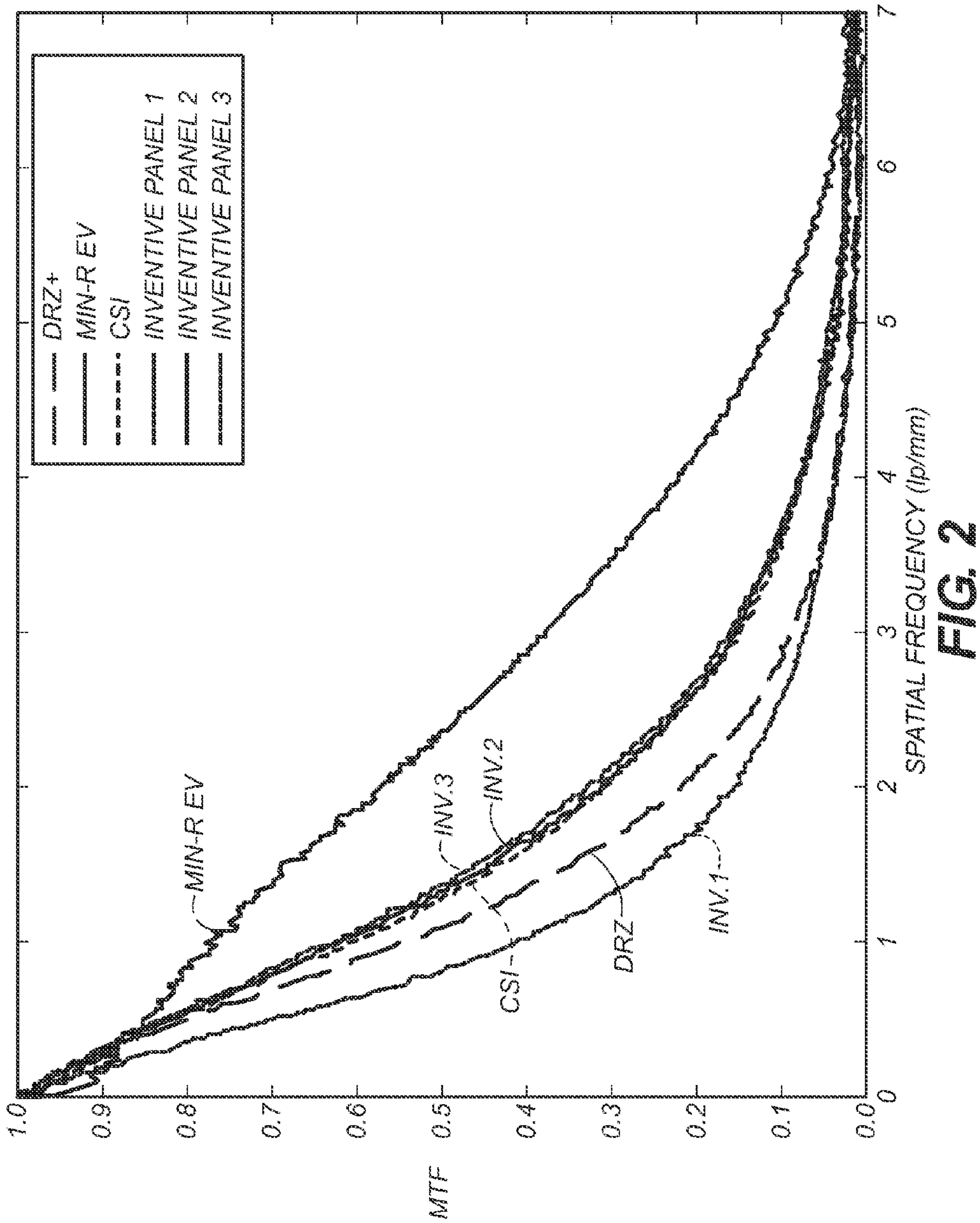
FIG. 2 compares the MTF performance of a scintillator panel in accordance with various embodiments of the present disclosure versus comparative scintillator panels in the art.
Figure 3:
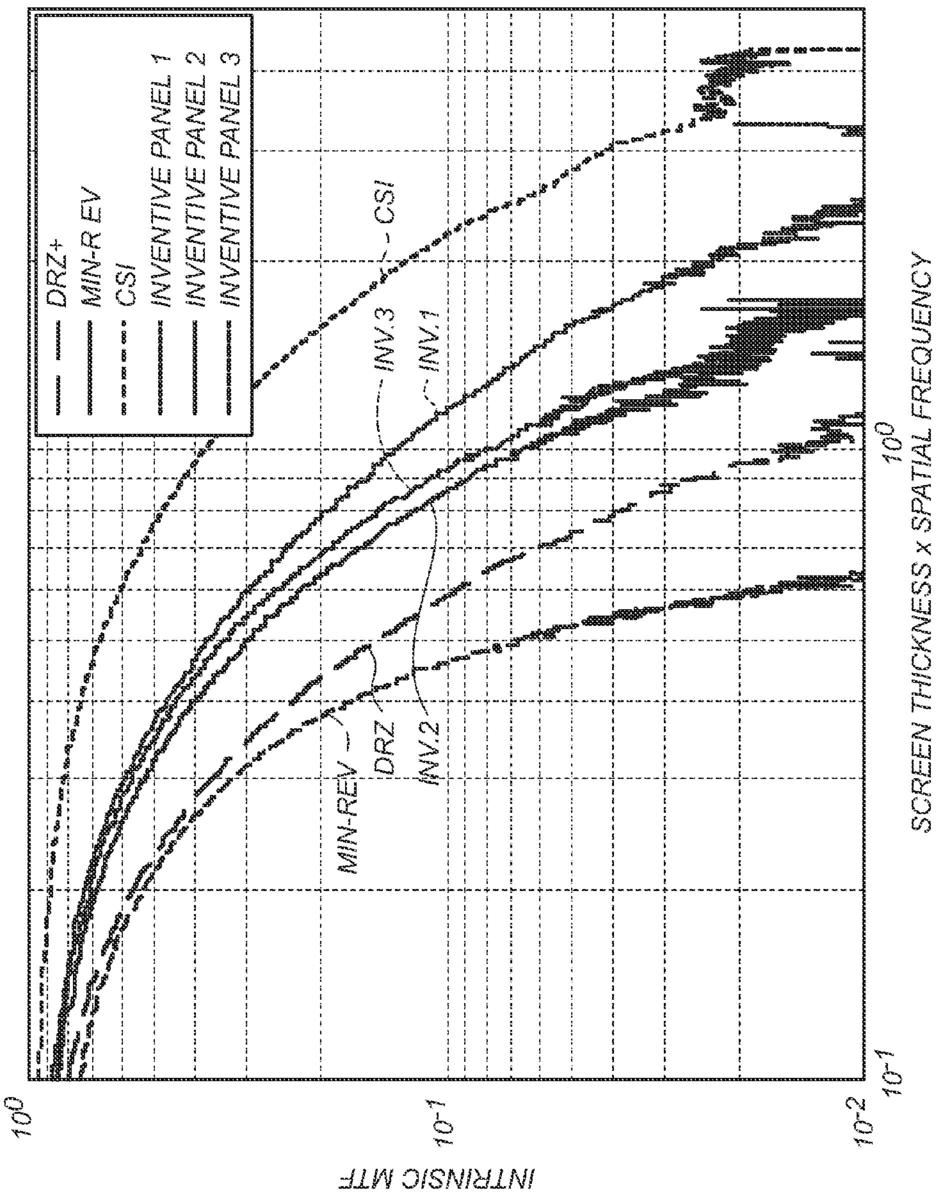
FIG. 3 compares the intrinsic MTF performance of a scintillator panel in accordance with various embodiments of the present disclosure versus scintillator panels in the art.

The MTFs of all of the panels in Table 4 were measured using MTF methods described above. Results are shown in FIG. 2. The intrinsic MTFs of all the panels in Table 4 were calculated from the measured MTF using the equation iMTF (ν)=MTF(f*1), as shown in FIG. 3. The iH50 (value of ν at which iMTF=0.5) was also calculated for each of the panels in Table 4, using the same equation above, as described in Table 5 below:

TABLE 5

| Panel Type | iH50 |
|---|---|
| DRZ+ | 0.22 |
| MinR-EV | 0.21 |
| CsI | 0.76 |
| Inventive Panel 1 | 0.37 |
| Inventive Panel 2 | 0.24 |
| Inventive Panel 3 | 0.345 |

As seen in FIGS. 2 and 3, a large gap exists between the MTF and iMTF performance of solvent-coated panels (DRZ+, available from MCI Optonix, LLC, and Kodak MIN-R EV, available from Carestream Health) versus CsI panels; however, the MTFs and iMTFs of the disclosed extruded panels are superior to the solvent-coated panels and approach the iMTF of CsI panels. Without being limited by theory, it is believed that forming the scintillation layer 120 by extrusion increases the homogeneity of the scintillation layer and eliminates undesirable "evaporated space" (which can contribute to decreased spatial resolution) when a solvent is evaporated in solvent-coating methods, thereby increasing the transparency of the scintillation layer 120 and spatial resolution of a scintillator panel comprising the disclosed scintillation layer 120. Additionally, without being limited by theory, it is also believed that the disclosed extruded scintillator panels have reduced refractive index mismatching as compared to solvent-coated panels (i.e., when the materials comprising the scintillation layer have disparate refractive indices, the amount of optical photons scattered is relatively large; the more disparate the refractive indices, the more light is scattered, the lower the image resolution), and therefore display increased transparency and improved spatial resolution as compared to solvent-coated panels.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A transparent scintillator panel comprising:

an extruded homogeneous scintillation layer comprising a non-scintillating thermoplastic polyolefin and an inorganic scintillator material, wherein the transparent scintillator panel has an intrinsic MTF at least 5% greater than the iH50 of a solvent-coated-non-patterned screen.

2. The transparent scintillator panel of claim 1, wherein the transparent scintillator panel has an intrinsic MTF of about 50% to about 95% greater than the iH50 of a solvent-coated non-patterned screen.

3. The transparent scintillator panel of claim 1, wherein the thermoplastic olefin comprises low density polyethylene.

4. The transparent scintillator panel of claim 3, wherein the scintillator material comprises at least one phosphor selected from the group consisting of $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $GdO_2S$:Tb, $GdO_2S$:Pr; $RE_3Al5O_{12}$:Ce, and combinations thereof, wherein RE is at least one rare earth metal.

5. The transparent scintillator panel of claim 1, wherein the scintillator material is present in the extruded scintillation layer in an amount ranging from about 50% by volume to about 99% by volume, relative to the volume of the extruded scintillation layer.

6. The transparent scintillator panel of claim 1, wherein the scintillator material is present in the extruded scintillation layer in an amount ranging from about 70% by volume to about 90% by volume, relative to the volume of the extruded scintillation layer.

7. The transparent scintillator panel of claim 1, further comprising an extruded opaque layer comprising carbon black.

8. The transparent scintillator panel of claim 1, wherein the extruded scintillation layer comprises a thickness ranging from about 25 μm to about 1000 μm.

9. A scintillation detection system comprising:

a transparent scintillator panel comprising an extruded homogeneous scintillation layer comprising a thermoplastic polyolefin and an inorganic scintillator material; and at least one photodetector coupled to the transparent scintillator panel, wherein at least one photodetector is configured to detect photons generated from the transparent scintillator panel.

10. The scintillation detection system of claim 9, wherein the thermoplastic olefin comprises low density polyethylene and the scintillator material comprises at least one phosphor selected from the group consisting of $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $GdO_2S$:Tb, $GdO_2S$:Pr; $RE_3Al5O_{12}$:Ce, and combinations thereof, wherein RE is at least one rare earth metal.

11. The scintillation detection system of claim 9, wherein the scintillator material is present in the extruded scintillation layer in an amount ranging from about 50% by volume to about 99% by volume, relative to the volume of the extruded layer.

12. The scintillation detection system of claim 9, wherein the transparent scintillator panel further comprises an extruded opaque layer comprising carbon black, wherein the at least one photodetector comprises at least one of photomultiplier tubes, photodiodes, phototransistors, charge coupled array devices, and combinations thereof.

13. The scintillation detection system of claim 9, wherein the extruded scintillation layer comprises a thickness ranging from about 25 μm to about 1000 μm.

14. A method of making a transparent scintillator panel comprising:

providing thermoplastic particles comprising at least one thermoplastic polyolefin and an inorganic scintillator material; and melt extruding the thermoplastic particles to form an extruded scintillation layer, where the extruded scintillation layer is a homogeneous scintillation layer.

15. The method of claim 14, further comprising co-extruding an opaque layer with the extruded scintillation layer.

16. The method of claim 14, wherein the transparent scintillator panel has an intrinsic MTF at least 5% greater than the iH50 of a solvent-coated non-patterned screen.

* * * * *